(12) United States Patent
Liu et al.

(10) Patent No.: US 8,855,319 B2
(45) Date of Patent: Oct. 7, 2014

(54) AUDIO SIGNAL PROCESSING APPARATUS AND AUDIO SIGNAL PROCESSING METHOD

(75) Inventors: Wei-Han Liu, Kaohsiung (TW); Hsiao-Yu Han, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 591 days.

(21) Appl. No.: 13/115,115

(22) Filed: May 25, 2011

(65) Prior Publication Data

US 2012/0300943 A1 Nov. 29, 2012

(51) Int. Cl.
*H04R 5/00* (2006.01)
*G11B 20/00* (2006.01)
*G11B 20/10* (2006.01)

(52) U.S. Cl.
CPC *G11B 20/00992* (2013.01); *G11B 2020/10546* (2013.01); *G11B 2020/10592* (2013.01); *G11B 2220/2537* (2013.01); *G11B 2020/10601* (2013.01)
USPC .................................. 381/17; 381/22; 381/80

(58) Field of Classification Search
CPC .................................... H04R 5/00; H04B 3/00
USPC .................................. 381/1, 17–19, 20–22, 80
See application file for complete search history.

(56) References Cited

U.S. PATENT DOCUMENTS

| 7,792,311 | B1 * | 9/2010 | Holmgren et al. | 381/61 |
| 2008/0194225 | A1 * | 8/2008 | Tischer et al. | 455/404.2 |
| 2008/0319764 | A1 * | 12/2008 | Nagle et al. | 704/500 |
| 2010/0296656 | A1 * | 11/2010 | Oh et al. | 381/17 |

* cited by examiner

*Primary Examiner* — Disler Paul
(74) *Attorney, Agent, or Firm* — Winston Hsu; Scott Margo

(57) ABSTRACT

An audio signal processing apparatus and an audio signal processing method are provide. The audio signal processing apparatus comprises: a plurality of individual audio interfaces, an audio signal processing unit, and an audio channel splitting unit. The audio signal processing unit is utilized for determining a total number of audio channels corresponding to the individual audio interfaces and generating a first output audio signal with a first number of audio channels according to an input audio signal and the total number of audio channels when the audio signal processing apparatus is operated under a first operational mode. The audio channel splitting unit is coupled to the audio signal processing unit and the audio interfaces. When the audio signal processing apparatus is operated under the first operational mode, the audio channel splitting unit splits the first output audio signal with the first number of audio channels to the audio interfaces, respectively.

12 Claims, 11 Drawing Sheets

AUDIO SIGNAL PROCESSING APPARATUS AND AUDIO SIGNAL PROCESSING METHOD

BACKGROUND

The disclosed embodiments of the present invention relate to an audio signal processing apparatus and an audio signal processing method, and more particularly, to an audio signal processing apparatus and an audio signal processing method that can generate an optimal audio output for multimedia devices including a VCD player, a DVD player and a BD player, etc.

Please refer to FIG. 1. FIG. 1 is a simplified block diagram illustrating a conventional audio signal processing apparatus 100 applied to a BD player. As shown in FIG. 1, the audio signal processing apparatus 100 comprises: an HDMI audio interface 102, an analog audio interface 104, a first downmixing unit 106, a second downmixing unit 108, and a decoding unit 110. The decoding unit 110 is utilized for decoding an input audio signal Si to generate a first output audio signal S1 with a first number of audio channels. The first downmixing unit 106 is utilized for downmixing the first output audio signal S1 according to an audio channel configuration of the HDMI audio interface 102 to generate a second output audio signal S2 with a second number of audio channels for the HDMI audio interface 102. The second downmixing unit 108 is utilized for downmixing the first output audio signal S1 according to an audio channel configuration of the analog audio interface 104 to generate a third output audio signal S3 with a third number of audio channels for the analog audio interface 104.

However, for example, if the first output audio signal S1 has 5 audio channels (such as a center audio channel, a main left audio channel, a main right audio channel, a left surround audio channel, and a right surround audio channel), and the second output audio signal S2 only has 2 audio channels (such as a main left audio channel and a main right audio channel) due to the audio channel configuration of the HDMI audio interface 102 is a main left audio channel and a main right audio channel, and the third output audio signal S3 also only has 2 audio channels (such as a main left audio channel and a main right audio channel) due to the audio channel configuration of the analog audio interface 104 is a main left audio channel and a main right audio channel, then the audio signal processing apparatus 100 only can provide two output audio signals S2, S3 of 2 audio channels when the audio signal processing apparatus 100 receives the input audio signal Si having 5 audio channels. In other words, the audio signal processing apparatus 100 only can provide two output audio signals S2, S3 with a main left audio channel and a main right audio channel even the audio signal processing apparatus 100 receives the input audio signal Si having a center audio channel, a main left audio channel, a main right audio channel, a left surround audio channel, and a right surround audio channel. In this way, if the audio signal processing apparatus 100 is coupled to four speakers via the HDMI audio interface 102 and the analog audio interface 104, the four speakers only can output sounds of a main left audio channel and a main right audio channel.

SUMMARY OF THE INVENTION

In accordance with exemplary embodiments of the present invention, an audio signal processing apparatus and an audio signal processing method are proposed to solve the above-mentioned problem.

According to a first aspect of the present invention, an exemplary audio signal processing apparatus is disclosed. The audio signal processing apparatus comprises: a plurality of individual audio interfaces, an audio signal processing unit, and an audio channel splitting unit. The audio signal processing unit is utilized for determining a total number of audio channels corresponding to the individual audio interfaces and generating a first output audio signal with a first number of audio channels according to an input audio signal and the total number of audio channels when the audio signal processing apparatus is operated under a first operational mode. The audio channel splitting unit is coupled to the audio signal processing unit and the audio interfaces, wherein when the audio signal processing apparatus is operated under the first operational mode, the audio channel splitting unit splits the first output audio signal with the first number of audio channels to the audio interfaces, respectively.

According to a first aspect of the present invention, an exemplary audio signal processing method is disclosed. The audio signal processing method comprises: when an operational mode is a first operational mode: determining a total number of audio channels corresponding to a plurality of individual audio interfaces; generating a first output audio signal with a first number of audio channels according to an input audio signal and the total number of audio channels; and splitting the first output audio signal with the first number of audio channels to the audio interfaces, respectively.

Briefly summarized, the audio signal processing apparatus and the audio signal processing method disclosed by the present invention are obviously capable of generating an optimal audio output for multimedia devices including a VCD player, a DVD player and a BD player, etc.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple/electrically connect" is intended to mean either an indirect or direct electrical connection. Accordingly, if one device is coupled to another device, that connection may be through a direct electrical connection, or through an indirect electrical connection via other devices and connections.

Figure 1:
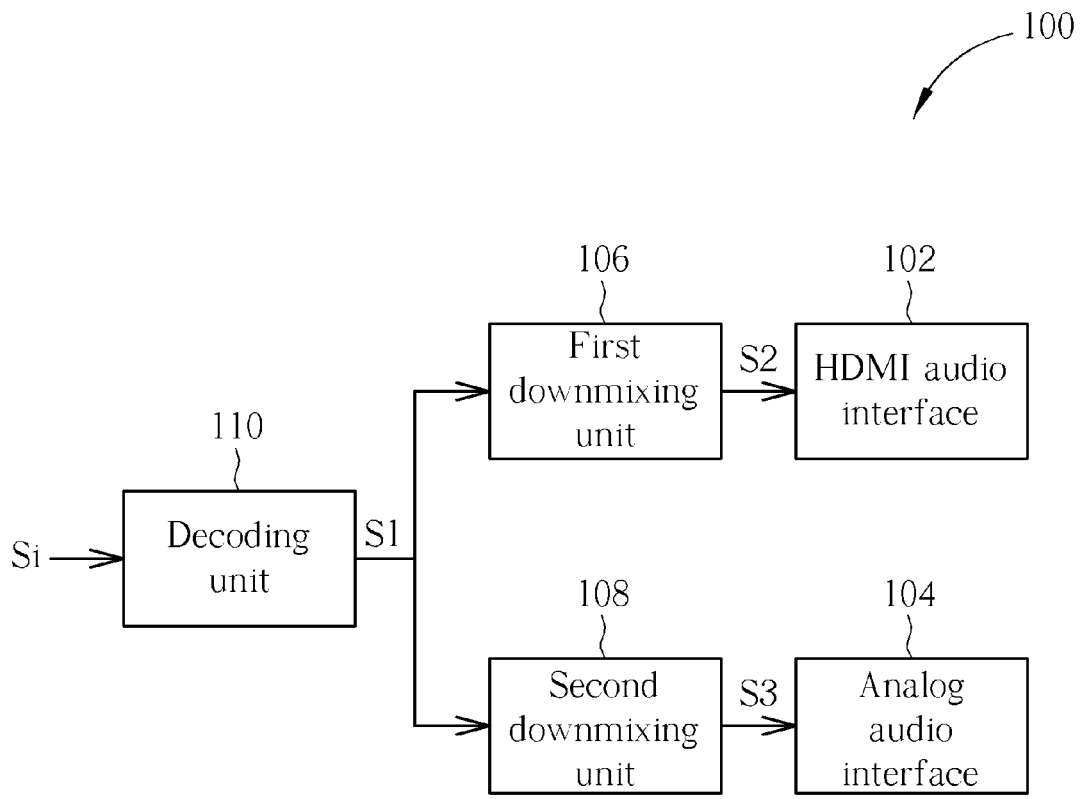
FIG. 1 is a simplified block diagram illustrating a conventional audio signal processing apparatus applied to a BD player.
Figure 2:
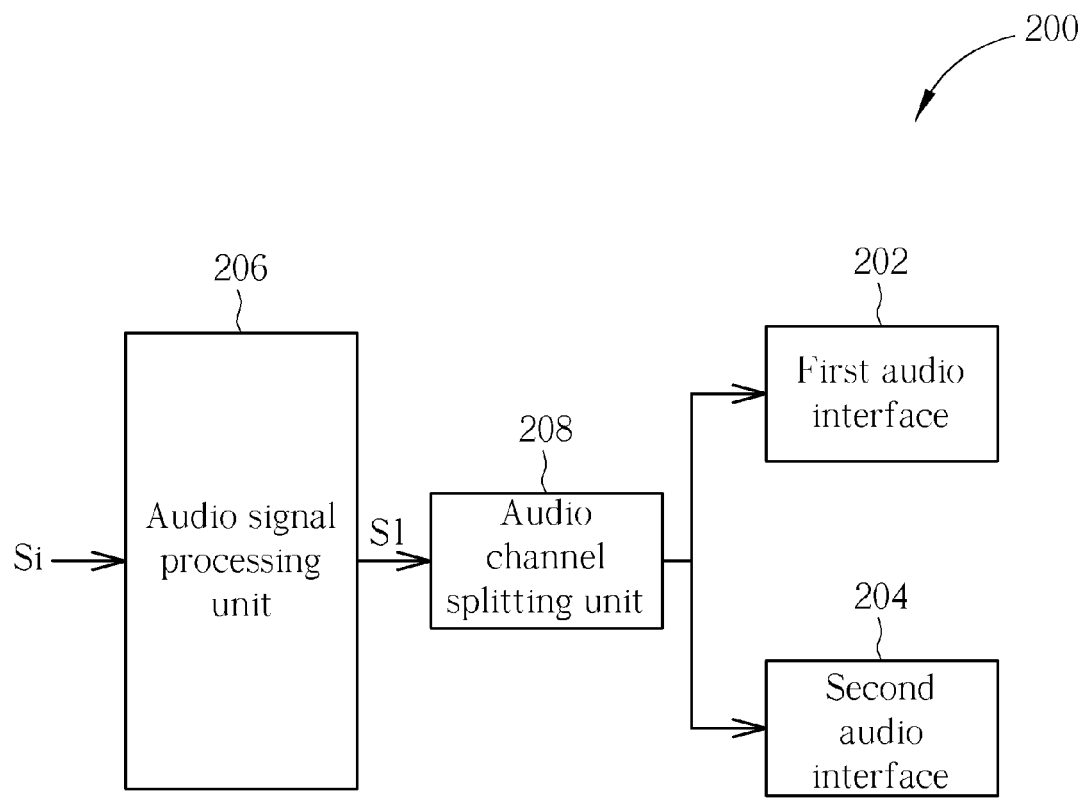
FIG. 2 is a block diagram illustrating a first exemplary embodiment of an audio signal processing apparatus according to the present invention.

Please refer to FIG. 2. FIG. 2 is a block diagram illustrating a first exemplary embodiment of an audio signal processing apparatus 200 according to the present invention, wherein the audio signal processing apparatus 200 can be applied to multimedia devices including a VCD player, a DVD player and a BD player, etc. As shown in FIG. 2, the audio signal processing apparatus 200 comprises: a first audio interface 202, a second audio interface 204, an audio signal processing unit 206, and an audio channel splitting unit 208, wherein the first audio interface 202 and the second audio interface 204 can be SPDIF interface, a coaxial interface, a HDMI interface, or an analog interface. The audio signal processing unit 206 is utilized for determining a total number of audio channels corresponding to the first audio interface 202 and the second audio interface 204 and generating a first output audio signal S1 with a first number of audio channels according to an input audio signal Si and the total number of audio channels when the audio signal processing apparatus 200 is operated under a first operational mode, wherein the total number of audio channels of the audio interfaces can be determined by a user interface setting or an HDMI Extended Display Identification Data (EDID) if the first audio interface 202 and the second audio interface 204 comprise at least an HDMI interface.

The audio channel splitting unit 208 is coupled to the audio signal processing unit 206, the first audio interface 202, and the second audio interface 204, wherein when the audio signal processing apparatus 200 is operated under the first operational mode, the audio channel splitting unit 208 splits the first output audio signal S1 with the first number of audio channels to the first audio interface 202 and the second audio interface 204, respectively.

For example, when the input audio signal Si has 5 audio channels (such as a center audio channel, a main left audio channel, a main right audio channel, a left surround audio channel, and a right surround audio channel), and the first audio interface 202 and the second audio interface 204 respectively have 2 audio channels, the total number of audio channels corresponding to the first audio interface 202 and the second audio interface 204 determined by the audio signal processing unit 206 will be 4, and the audio signal processing unit 206 will generate the first output audio signal S1 with 4 audio channels according to the input audio signal Si and the total number of audio channels when the audio signal processing apparatus 200 is operated under a first operational mode. Next, when the audio signal processing apparatus 200 is operated under the first operational mode, the audio channel splitting unit 208 will split the first output audio signal S1 with 4 audio channels to the first audio interface 202 and the second audio interface 204, respectively. In other words, the audio signal processing apparatus 200 can provide an output audio signal with a main left audio channel, a main right audio channel, a left surround audio channel, and a right surround audio channel when the audio signal processing apparatus 200 receives the input audio signal having a center audio channel, a main left audio channel, a main right audio channel, a left surround audio channel, and a right surround audio channel. In this way, if the audio signal processing apparatus 200 is coupled to four speakers via the first audio interface 202 and the second audio interface 204, the four speakers can output sounds of a main left audio channel, a main right audio channel, a left surround audio channel, and a right surround audio channel. Please note that the above embodiment is only for an illustrative purpose and is not meant to be a limitation of the present invention. For example, the audio signal processing apparatus 200 can comprise more audio interfaces according to different design requirements.

Figure 3:
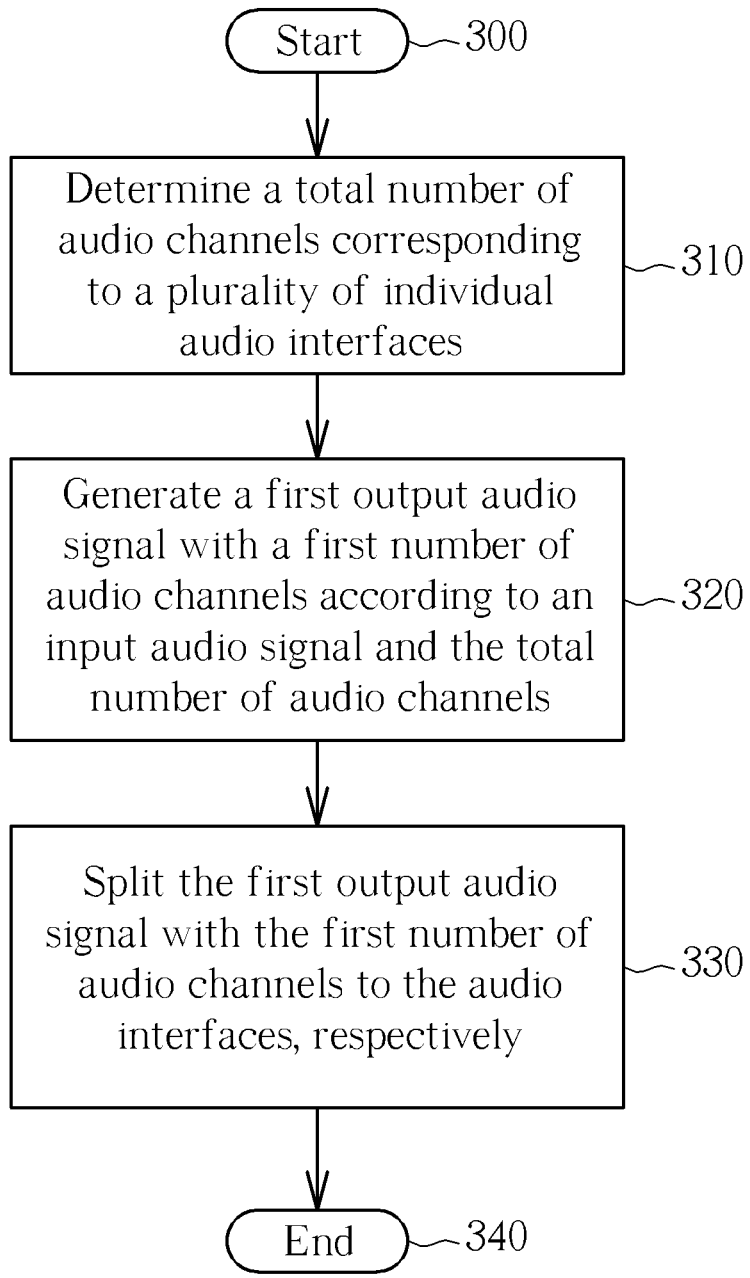
FIG. 3 is a flowchart showing an audio signal processing method in accordance with the operation schemes of the audio signal processing apparatus shown in FIG. 2.

Please refer to FIG. 3. FIG. 3 is a flowchart showing an audio signal processing method in accordance with the operation schemes of the audio signal processing apparatus 200 shown in FIG. 2. Provided that the result is substantially the same, the steps in FIG. 3 are not required to be executed in the exact order shown in FIG. 3. The audio signal processing method in accordance with the first exemplary embodiment of the audio signal processing apparatus 200 in the present invention comprises the following steps:

Step 300: Start.

Step 310: Determine a total number of audio channels corresponding to a plurality of individual audio interfaces.

Step 320: Generate a first output audio signal with a first number of audio channels according to an input audio signal and the total number of audio channels.

Step 330: Split the first output audio signal with the first number of audio channels to the audio interfaces, respectively.

Step 340: End.

Figure 4:
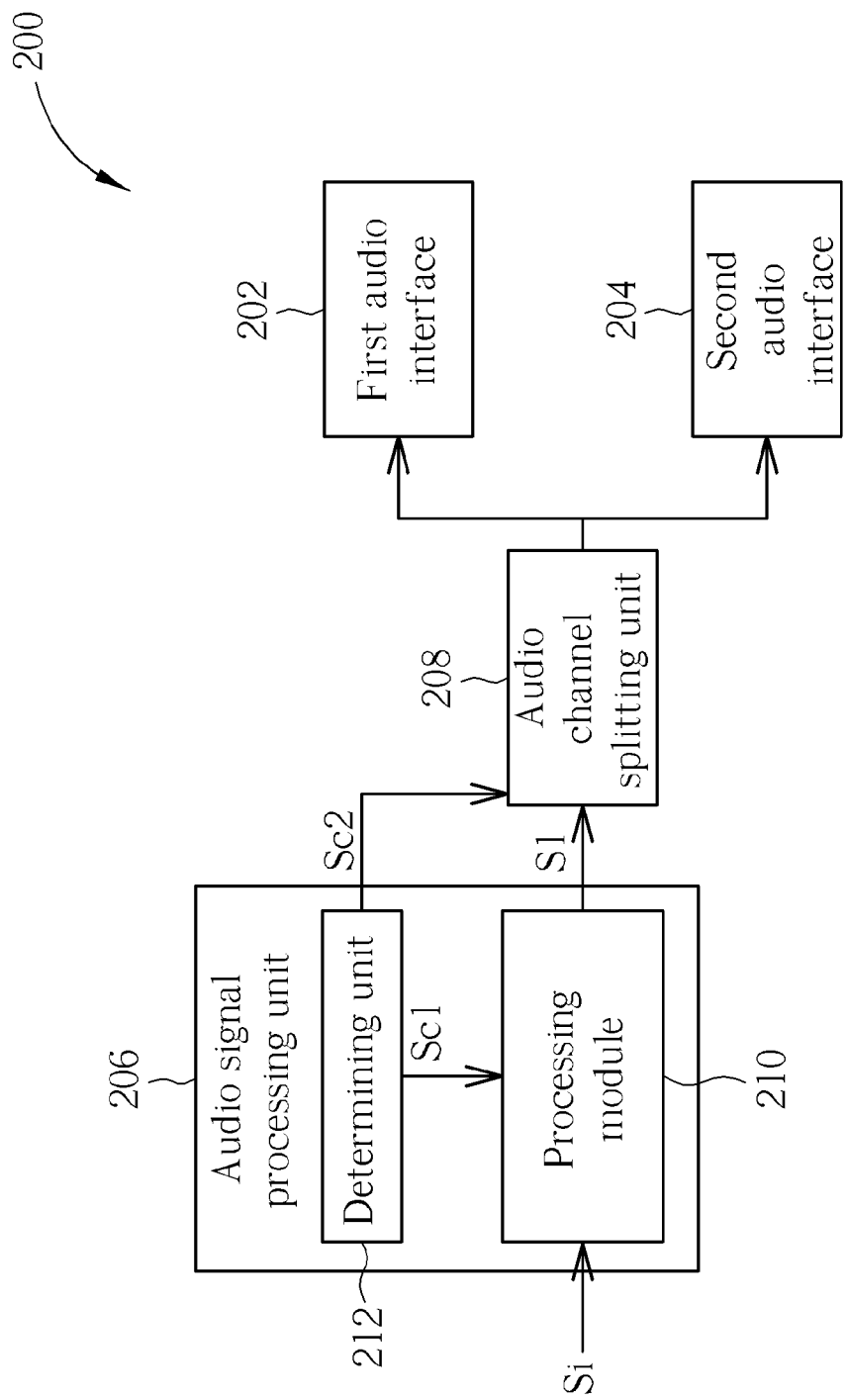
FIG. 4 is a block diagram illustrating a second exemplary embodiment of an audio signal processing apparatus according to the present invention.

Next, in a second exemplary embodiment of the present invention, the audio signal processing unit 206 in FIG. 2 can comprise a processing module 210 and a determining unit 212, as shown in FIG. 4. The processing module 210 is coupled to the audio channel splitting unit 208, and utilized for generating the first output audio signal S1 by processing the input audio signal Si according to a first control signal Sc1 when the audio signal processing apparatus 200 is operated under the first operational mode. The determining unit 212 is coupled to the processing module 210 and the audio channel splitting unit 208, and utilized for determining the total number of audio channels and generating the first control signal Sc1 and a second control signal Sc2 according to the total number of audio channels corresponding to the first audio interface 202 and the second audio interface 204 when the audio signal processing apparatus 200 is operated under the first operational mode, wherein the audio channel splitting unit 208 splits the first output audio signal S1 according to the second control signal Sc2.

Figure 5:
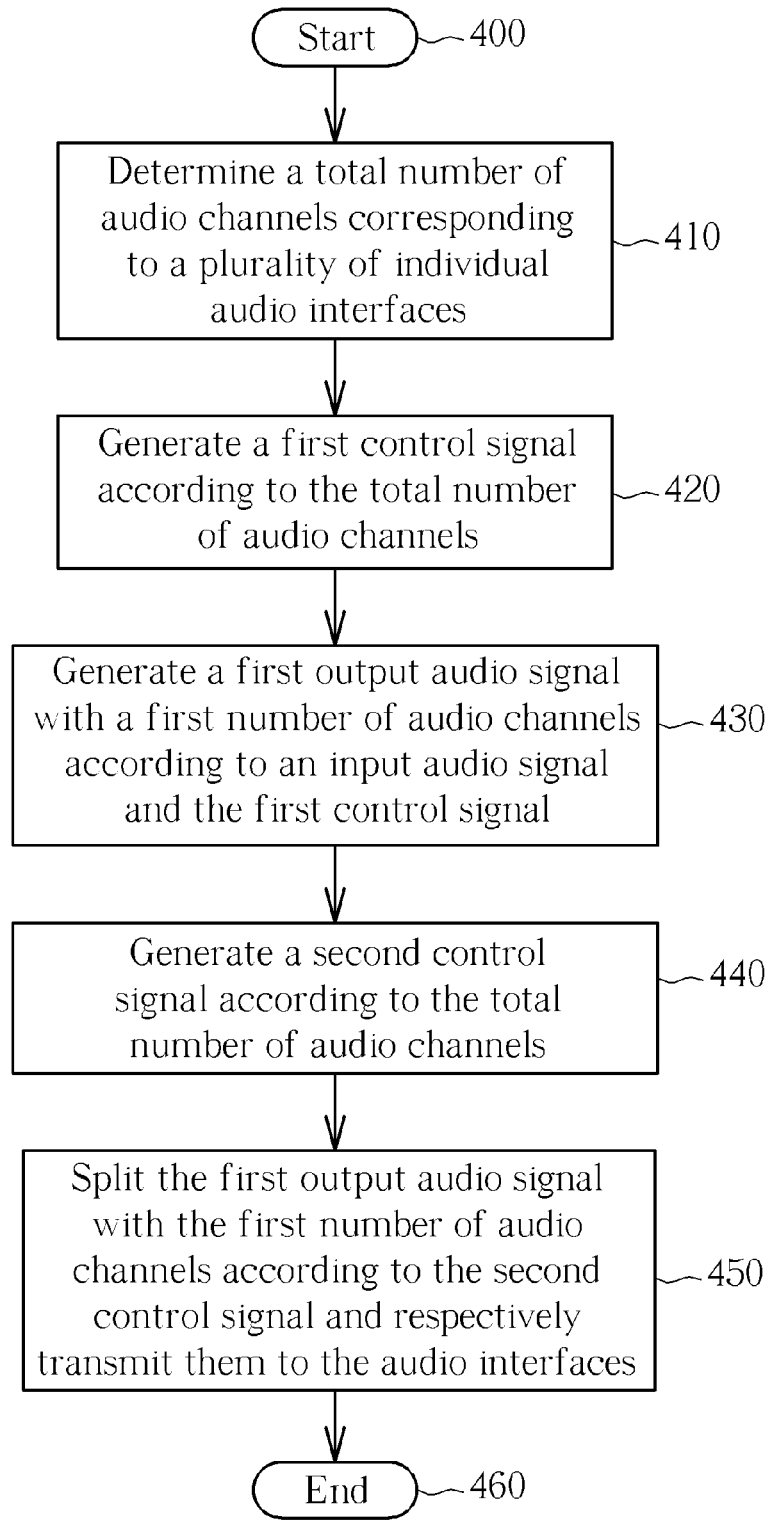
FIG. 5 is a flowchart showing an audio signal processing method in accordance with the operation schemes of the audio signal processing apparatus shown in FIG. 4.

Please refer to FIG. 5. FIG. 5 is a flowchart showing an audio signal processing method in accordance with the operation schemes of the audio signal processing apparatus 200 shown in FIG. 4. Provided that the result is substantially the same, the steps in FIG. 5 are not required to be executed in the exact order shown in FIG. 5. The audio signal processing method in accordance with the second exemplary embodiment of the audio signal processing apparatus 200 in the present invention comprises the following steps:

Step 400: Start.

Step 410: Determine a total number of audio channels corresponding to a plurality of individual audio interfaces.

Step 420: Generate a first control signal according to the total number of audio channels.

Step 430: Generate a first output audio signal with a first number of audio channels according to an input audio signal and the first control signal.

Step 440: Generate a second control signal according to the total number of audio channels.

Step 450: Split the first output audio signal with the first number of audio channels according to the second control signal and respectively transmit them to the audio interfaces.

Step 460: End.

Figure 6:
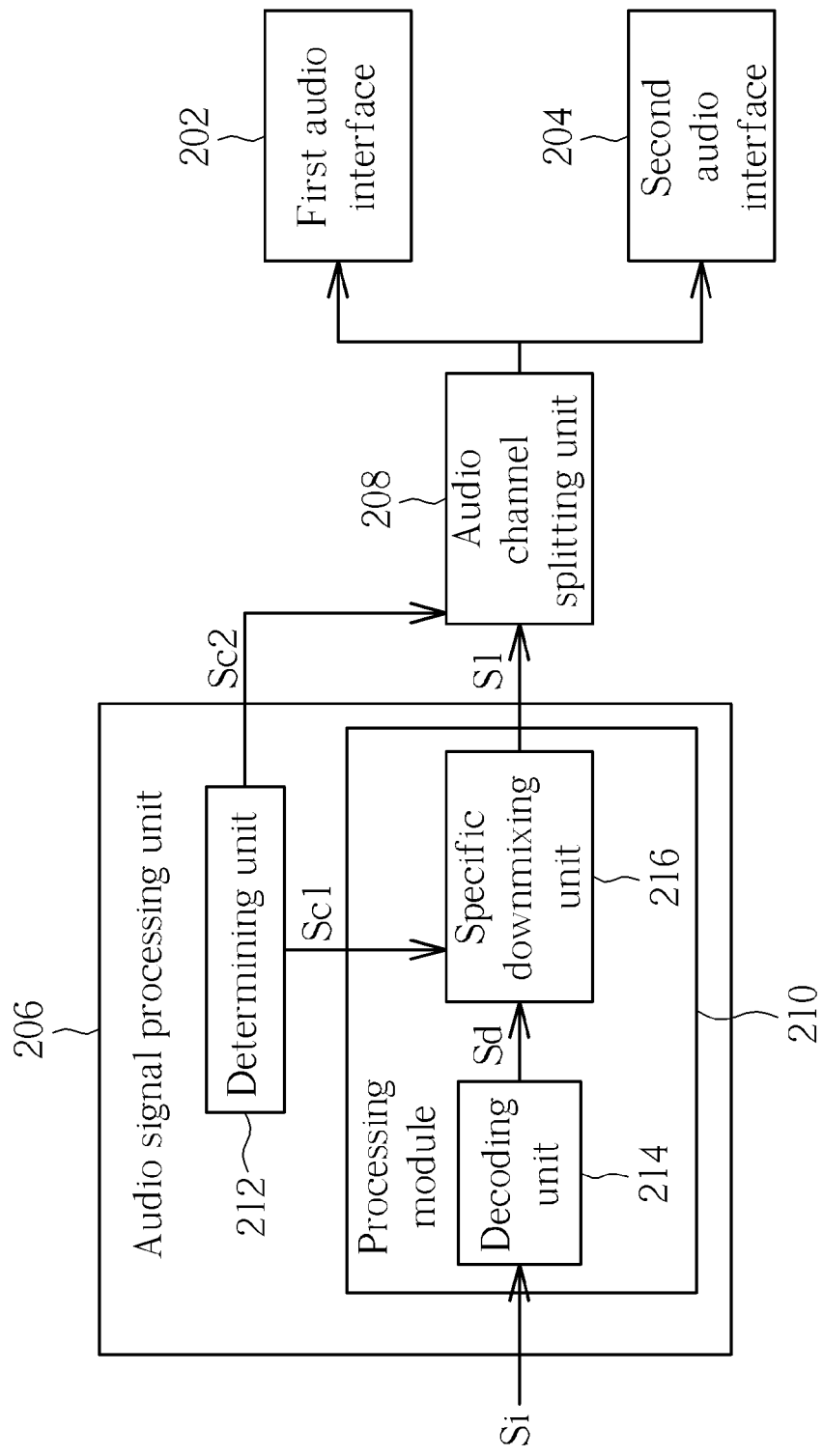
FIG. 6 is a block diagram illustrating a third exemplary embodiment of an audio signal processing apparatus according to the present invention.

Next, in a third exemplary embodiment of the present invention, the processing module 210 in FIG. 4 can comprise a decoding unit 214 and a specific downmixing unit 216, as shown in FIG. 6. The decoding unit 214 is utilized for decoding the input audio signal Si to generate a second output audio signal Sd with a second number of audio channels. The specific downmixing unit 216 is coupled to the decoding unit 214, and utilized for downmixing the second output audio signal Sd to generate the first output audio signal 51 according to the first control signal Sc1 when the audio signal processing apparatus 200 is operated under the first operational mode, wherein the first number of audio channels can be different from the second number of audio channels. For example, if the second output audio signal Sd has 5 audio channels and the total number of audio channels corresponding to the first audio interface 202 and the second audio interface 204 is 4, then the second number of audio channels is 5 and the first number of audio channels is 4. In other words, the specific downmixing unit 216 downmixes the second output audio signal Sd with 5 audio channels to generate the first output audio signal S1 with 4 audio channels according to the first control signal Sc1 when the audio signal processing apparatus 200 is operated under the first operational mode.

Figure 7:
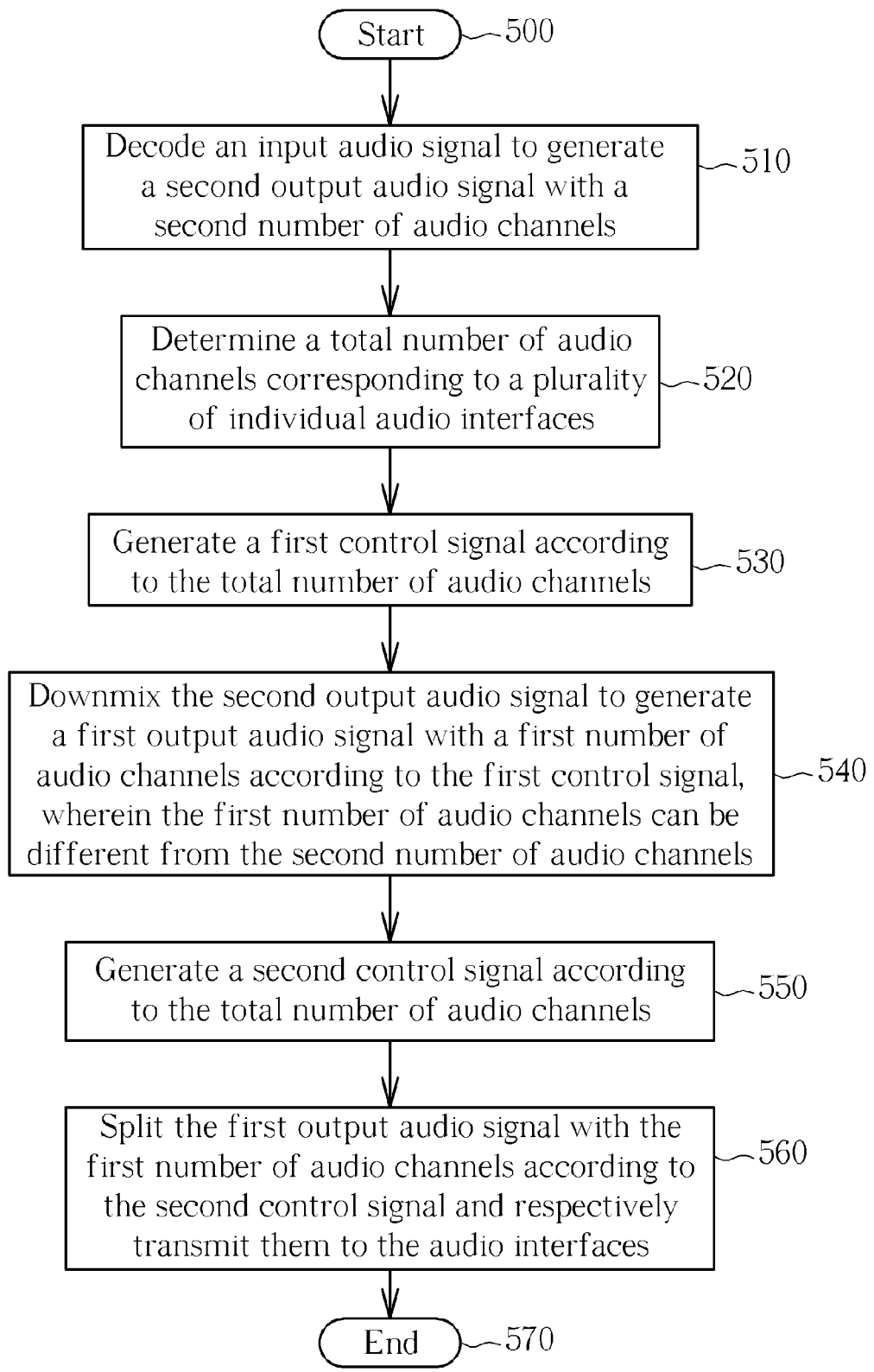
FIG. 7 is a flowchart showing an audio signal processing method in accordance with the operation schemes of the audio signal processing apparatus shown in FIG. 6.

Please refer to FIG. 7. FIG. 7 is a flowchart showing an audio signal processing method in accordance with the operation schemes of the audio signal processing apparatus 200 shown in FIG. 6. Provided that the result is substantially the same, the steps in FIG. 7 are not required to be executed in the exact order shown in FIG. 7. The audio signal processing method in accordance with the third exemplary embodiment of the audio signal processing apparatus 200 in the present invention comprises the following steps:

Step 500: Start.

Step 510: Decode an input audio signal to generate a second output audio signal with a second number of audio channels.

Step 520: Determine a total number of audio channels corresponding to a plurality of individual audio interfaces.

Step 530: Generate a first control signal according to the total number of audio channels.

Step 540: Downmix the second output audio signal to generate a first output audio signal with a first number of audio channels according to the first control signal, wherein the first number of audio channels can be different from the second number of audio channels.

Step 550: Generate a second control signal according to the total number of audio channels.

Step 560: Split the first output audio signal with the first number of audio channels according to the second control signal and respectively transmit them to the audio interfaces.

Step 570: End.

Figure 8:
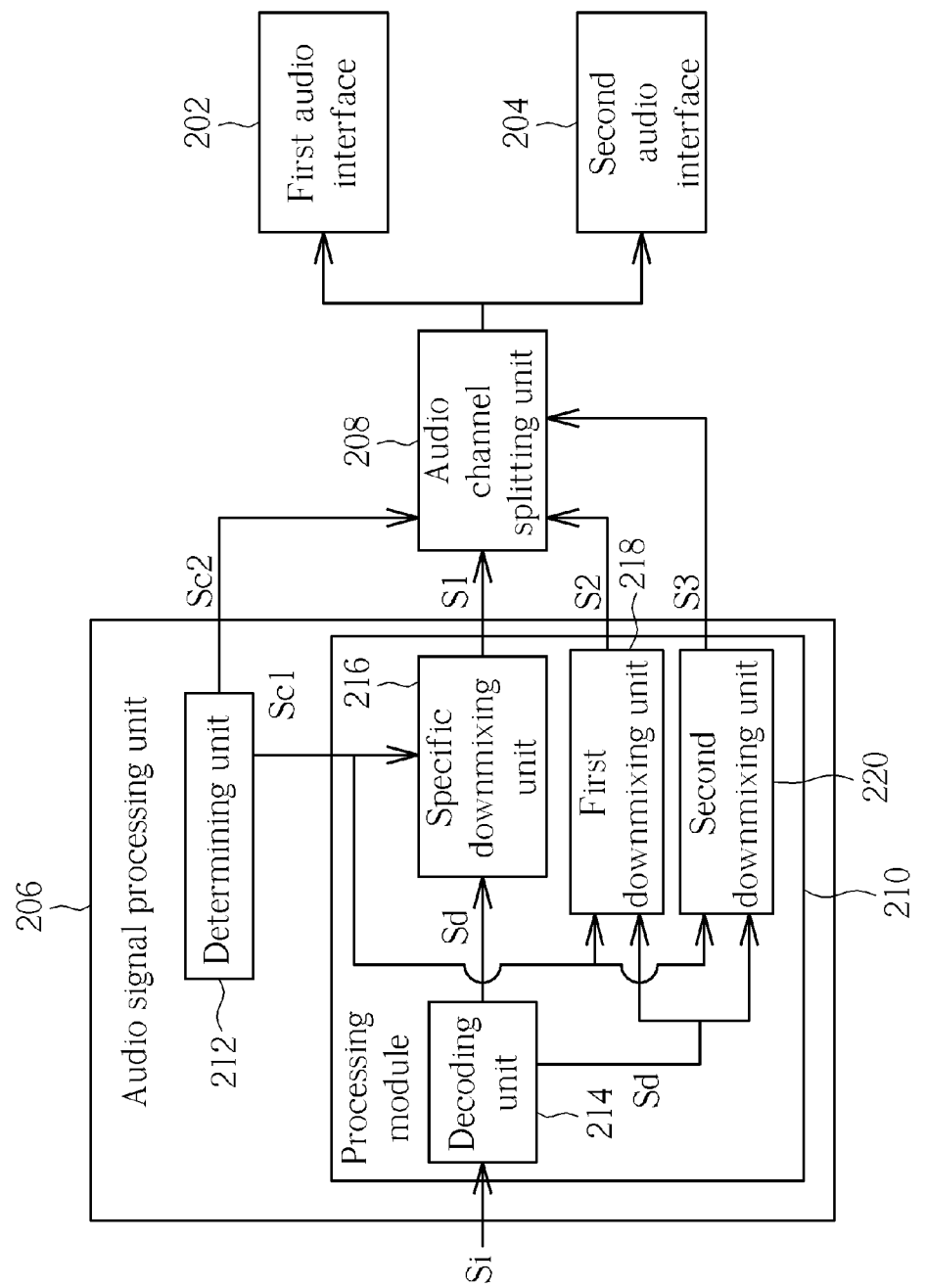
FIG. 8 is a block diagram illustrating a fourth exemplary embodiment of an audio signal processing apparatus according to the present invention.

Next, in a fourth exemplary embodiment of the present invention, the processing module 210 in FIG. 6 can further comprise a first downmixing unit 218 and a second downmixing unit 220 corresponding to the first audio interface 202 and the second audio interface 204, respectively, as shown in FIG. 8. In this embodiment, the determining unit 212 is further utilized for determining whether the audio signal processing apparatus 200 is operated under the first operational mode (i.e. a new operational mode provided by the present invention) or a second operational mode (i.e. a conventional operational mode). When the determining unit 212 determines that the audio signal processing apparatus 200 is operated under the second operational mode, the determining unit 212 controls each of the first downmixing unit 218 and the second downmixing unit 220 to downmix the second output audio signal Sd to generate a third output audio signal S2 with a third number of audio channels according to the first audio interface 202 and generate a fourth output audio signal S3 with a fourth number of audio channels according to the second audio interface 204, and the determining unit 212 controls the audio channel splitting unit 208 to bypass the third output audio signal S2 and the fourth output audio signal S3 generated from the first downmixing unit 218 and the second downmixing unit 220 to the first audio interface 202 and the second audio interface 204, respectively. Please note that the above embodiment is only for an illustrative purpose and is not meant to be a limitation of the present invention. For example, the audio signal processing apparatus 200 can comprise more audio interfaces according to different design requirements, and the processing module 210 can further comprise more downmixing units corresponding to the audio interfaces.

Figure 9:
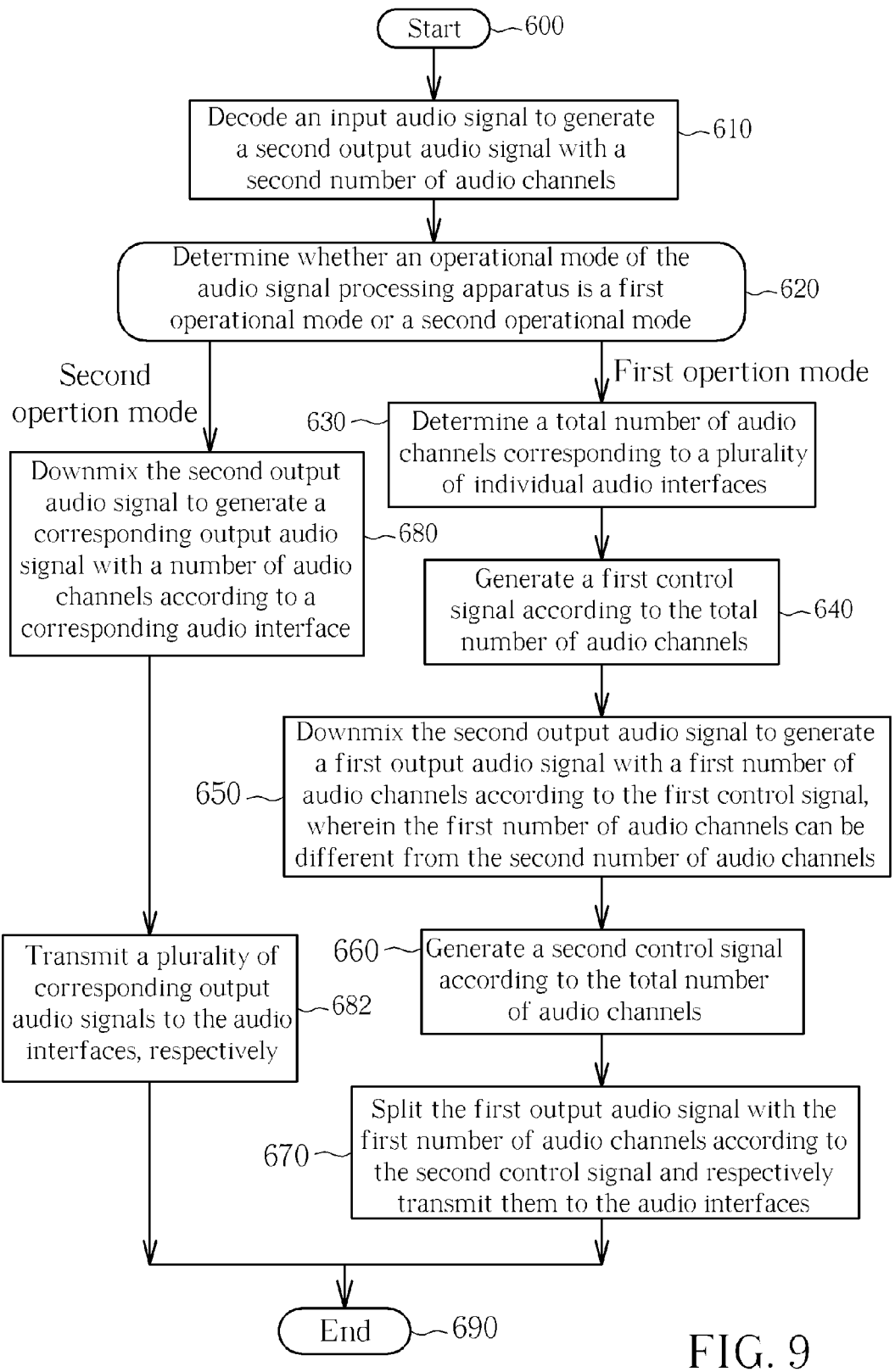
FIG. 9 is a flowchart showing an audio signal processing method in accordance with the operation schemes of the audio signal processing apparatus shown in FIG. 8.

Please refer to FIG. 9. FIG. 9 is a flowchart showing an audio signal processing method in accordance with the operation schemes of the audio signal processing apparatus 200 shown in FIG. 8. Provided that the result is substantially the same, the steps in FIG. 9 are not required to be executed in the exact order shown in FIG. 9. The audio signal processing method in accordance with the fourth exemplary embodiment of the audio signal processing apparatus 200 in the present invention comprises the following steps:

Step 600: Start.

Step 610: Decode an input audio signal to generate a second output audio signal with a second number of audio channels.

Step 620: Determine whether an operational mode of the audio signal processing apparatus is the first operational mode or a second operational mode; when the operation mode is determined to be a first operational mode, go to Step 630; and when the operation mode is determined to be a second operational mode, go to Step 680.

Step 630: Determine a total number of audio channels corresponding to a plurality of individual audio interfaces.

Step 640: Generate a first control signal according to the total number of audio channels.

Step 650: Downmix the second output audio signal to generate a first output audio signal with a first number of audio channels according to the first control signal, wherein the first number of audio channels can be different from the second number of audio channels.

Step 660: Generate a second control signal according to the total number of audio channels.

Step 670: Split the first output audio signal with the first number of audio channels according to the second control signal and respectively transmit them to the audio interfaces.

Step 680: Downmix the second output audio signal to generate a corresponding output audio signal with a number of audio channels according to a corresponding audio interface.

Step 682: Transmit a plurality of corresponding output audio signals to the audio interfaces, respectively.

Step 690: End.

Figure 10:
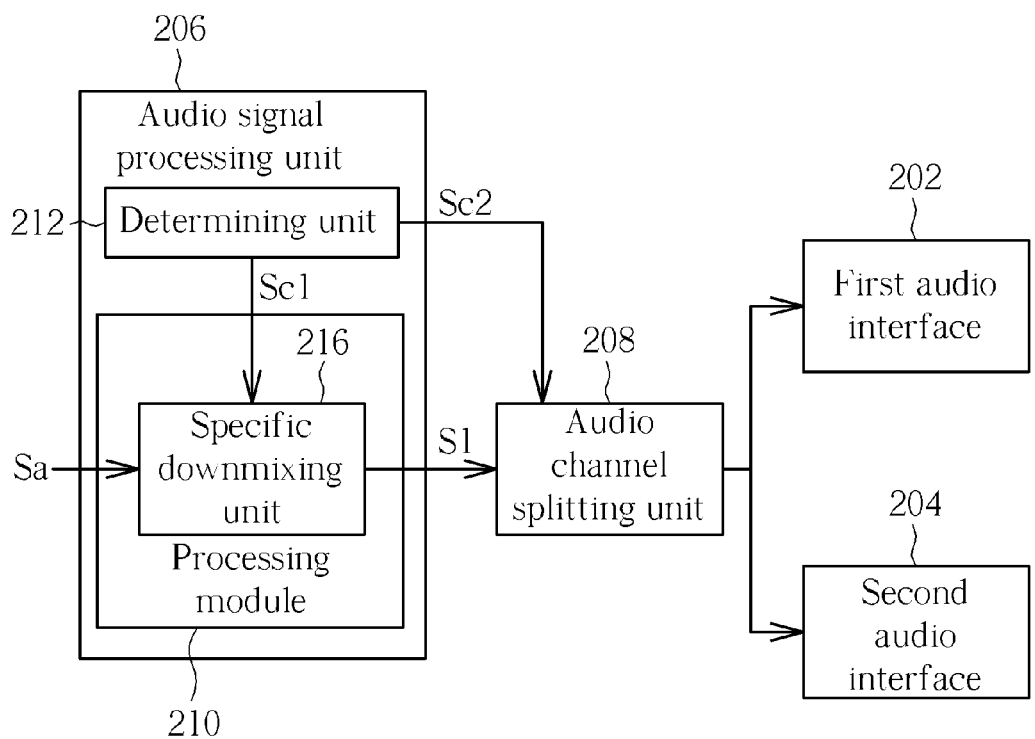
FIG. 10 is a block diagram illustrating a fifth exemplary embodiment of an audio signal processing apparatus according to the present invention.
Figure 11:
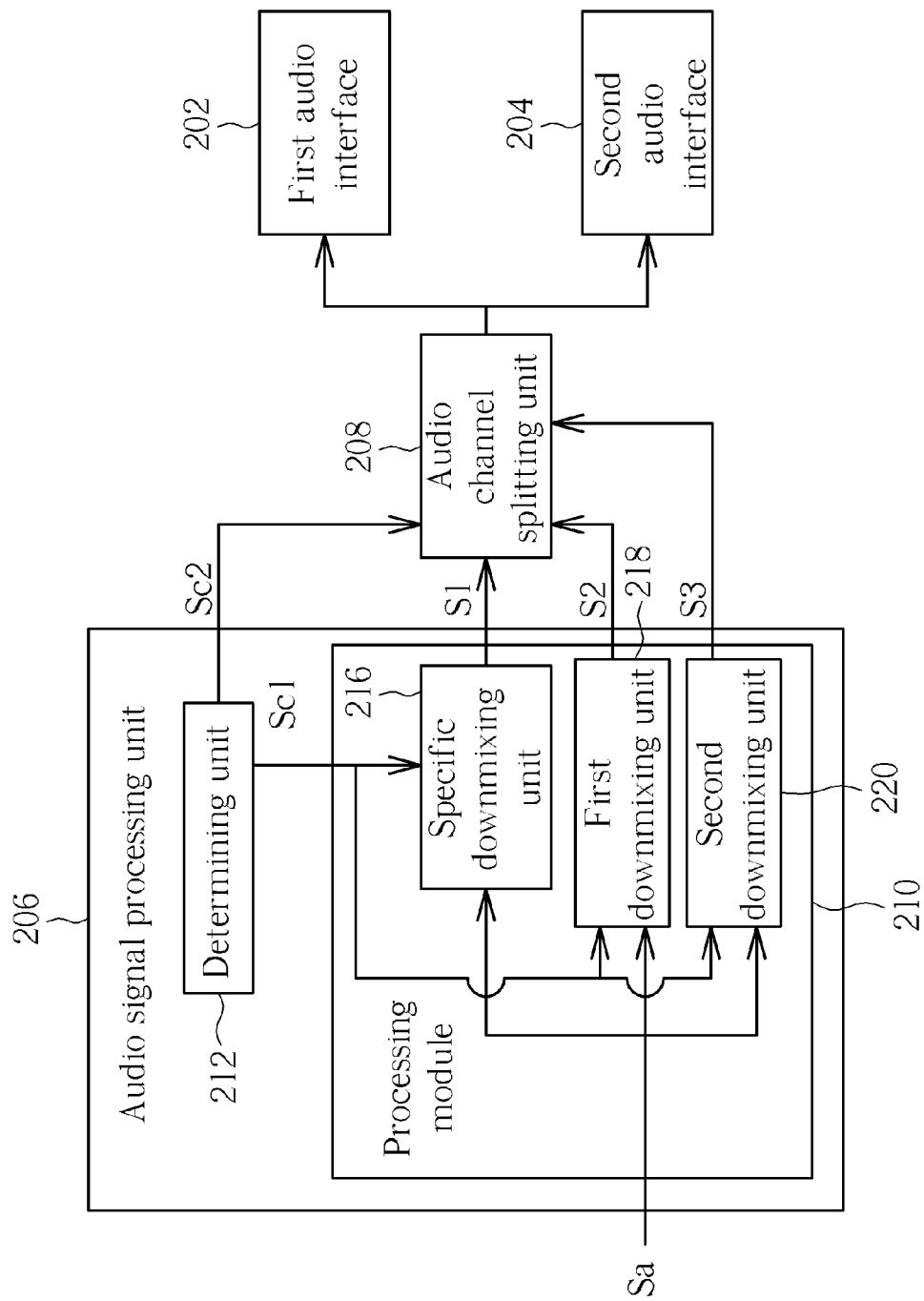
FIG. 11 is a block diagram illustrating a sixth exemplary embodiment of an audio signal processing apparatus according to the present invention.

In addition, please note that the decoding unit 214 in FIG. 6 and FIG. 8 can be omitted when the the input audio signal Si received by the audio signal processing apparatus 200 is not required to be decoded in other embodiments. In other words, the input audio signal Si can be a decoded audio signal Sa as shown in FIG. 10 and FIG. 11 showing a fifth exemplary embodiment and a sixth exemplary embodiment of the present invention, respectively.

Briefly summarized, the audio signal processing apparatus and the audio signal processing method disclosed by the present invention are obviously capable of generating an optimal audio output for multimedia devices including a VCD player, a DVD player and a BD player, etc.

Those skilled in the art will readily observe that numerous modifications and alterations of the device and method may be made while retaining the teachings of the invention.

What is claimed is:

1. An audio signal processing apparatus, comprising:
a plurality of individual audio interfaces;
an audio signal processing unit, for determining a total number of audio channels corresponding to the individual audio interfaces and generating a first output audio signal with a first number of audio channels according to an input audio signal and the total number of audio channels when the audio signal processing apparatus is operated under a first operational mode; and
an audio channel splitting unit, coupled to the audio signal processing unit and the audio interfaces, wherein when the audio signal processing apparatus is operated under the first operational mode, the audio channel splitting unit splits the first output audio signal with the first number of audio channels to the audio interfaces, respectively,
wherein the audio signal processing unit comprises:
a processing module, coupled to the audio channel splitting unit, for generating the first output audio signal by processing the input audio signal according to a first control signal when the audio signal processing apparatus is operated under the first operational mode,
wherein the processing module comprises:
a decoding unit, for decoding the input audio signal to generate a second output audio signal with a second number of audio channels; and
a specific downmixing unit, coupled to the decoding unit, for downmixing the second output audio signal to generate the first output audio signal according to the first control signal when the audio signal processing apparatus is operated under the first operational mode, wherein the first number of audio channels is different from the second number of audio channels.

2. The audio signal processing apparatus of claim 1, wherein the audio signal processing unit comprises:
a determining unit, coupled to the processing module and the audio channel splitting unit, for determining the total number of audio channels and generating the first control signal and a second control signal according to the total number of audio channels when the audio signal processing apparatus is operated under the first operational mode, wherein the audio channel splitting unit splits the first output audio signal according to the second control signal.

3. The audio signal processing apparatus of claim 2, wherein the processing module has a plurality of downmixing units corresponding to the audio interfaces, respectively; the specific downmixing unit is included in the downmixing units; the determining unit further determines whether the audio signal processing apparatus is operated under the first operational mode or a second operational mode; when the determining unit determines that the audio signal processing apparatus is operated under the second operational mode, the determining unit controls each of the downmixing units to downmix the second output audio signal to generate a corresponding output audio signal with a number of audio channels according to a corresponding audio interface, and the audio channel splitting unit bypasses a plurality of corresponding output audio signals generated from the downmixing units to the audio interfaces, respectively.

4. The audio signal processing apparatus of claim 1, wherein the total number of audio channels of the audio interfaces is determined by any combination of a specification of the audio interfaces, a user interface setting and an HDMI Extended Display Identification Data (EDID).

5. The audio signal processing apparatus of claim 1, being applied to multimedia devices including a DVD player and a BD player.

6. An audio signal processing apparatus, comprising:
a plurality of individual audio interfaces;
an audio signal processing unit, for determining a total number of audio channels corresponding to the individual audio interfaces and generating a first output audio signal with a first number of audio channels according to an input audio signal and the total number of audio channels when the audio signal processing apparatus is operated under a first operational mode; and
an audio channel splitting unit, coupled to the audio signal processing unit and the audio interfaces, wherein when the audio signal processing apparatus is operated under the first operational mode, the audio channel splitting unit splits the first output audio signal with the first number of audio channels to the audio interfaces, respectively, wherein one of the audio interfaces is a SPDIF interface, a coaxial interface, an HDMI interface, or an analog interface.

7. An audio signal processing method, comprising:
when an operational mode is a first operational mode:
determining a total number of audio channels corresponding to a plurality of individual audio interfaces;
generating a first output audio signal with a first number of audio channels according to an input audio signal and the total number of audio channels; and
splitting the first output audio signal with the first number of audio channels to the audio interfaces, respectively,
wherein the step of generating the first output audio signal with the first number of audio channels comprises:
generating a first control signal according to the total number of audio channels; and
generating the first output audio signal by processing the input audio signal according to the first control signal,
wherein the step of generating the first output audio signal by processing the input audio signal according to the first control signal comprises:
decoding the input audio signal to generate a second output audio signal with a second number of audio channels; and downmixing the second output audio signal to generate the first output audio signal according to the first control signal, wherein the first number of audio channels is different from the second number of audio channels.

8. The audio signal processing method of claim 7, further comprising:

determining whether the operational mode is the first operational mode or a second operational mode; and when the operation mode is determined to be the second operational mode:

downmixing the second output audio signal to generate a corresponding output audio signal with a number of audio channels according to a corresponding audio interface; and transmitting a plurality of corresponding output audio signals to the audio interfaces, respectively.

9. The audio signal processing method of claim 7, wherein the step of splitting the first output audio signal with the first number of audio channels to the audio interfaces comprises:

generating a second control signal according to the total number of audio channels; and splitting the first output audio signal according to the second control signal.

10. The audio signal processing method of claim 7, wherein one of the audio interfaces is a SPDIF interface, a coaxial interface, an HDMI interface, or an analog interface.

11. The audio signal processing method of claim 7, wherein the total number of audio channels of the audio interfaces is determined by any combination of a specification of the audio interfaces, a user interface setting, and an HDMI Extended Display Identification Data (EDID).

12. The audio signal processing method of claim 7, being applied to multimedia devices including a DVD player and a BD player.

* * * * *